United States Patent [19]

Falater et al.

[11] 4,342,048
[45] Jul. 27, 1982

[54] AUTOMATIC CRT TRACKING CIRCUIT

[75] Inventors: Scott L. Falater, Brookfield; Wayne E. Bretl, Schaumburg, both of Ill.

[73] Assignee: Zenith Radio Corporation, Glenview, Ill.

[21] Appl. No.: 179,368

[22] Filed: Aug. 18, 1980

[51] Int. Cl.³ .......................................... H04N 5/68
[52] U.S. Cl. ................................................. 358/242
[58] Field of Search ............... 358/29, 39, 243, 242, 358/74

[56] References Cited

U.S. PATENT DOCUMENTS

| | | |
|---|---|---|
| 3,598,905 | 8/1971 | Keptra, Jr. et al. |
| 3,612,757 | 10/1971 | Anderson |
| 3,670,095 | 6/1972 | Arumugham |
| 3,705,259 | 12/1972 | Lovely et al. |
| 3,737,562 | 6/1973 | Matzek |
| 3,820,155 | 6/1974 | Neal |
| 3,855,614 | 12/1974 | Okada |
| 3,976,836 | 8/1976 | Wheeler |
| 4,012,775 | 3/1977 | Smith ................... 358/29 |
| 4,070,691 | 1/1978 | Smith et al. ............ 358/29 |
| 4,160,995 | 7/1979 | Jensen ................... 358/29 |
| 4,253,121 | 2/1981 | Avery ................... 358/243 |
| 4,263,622 | 4/1981 | Hinn .................... 358/242 |

*Primary Examiner*—Robert L. Richardson
*Attorney, Agent, or Firm*—Jack Kail

[57] ABSTRACT

An automatic CRT tracking circuit for a television receiver includes an amplifier having adjustable gain and offset transfer functions for coupling a video signal to the cathode of the CRT electron gun. Feedback loops are used to adjust both the gain and offset transfer functions of the amplifier, either independently of each other or in a common mode, to compensate for changing cathode voltage versus cathode current characteristics such that a desired video signal versus cathode current relationship is achieved despite variations in the CRT.

16 Claims, 7 Drawing Figures

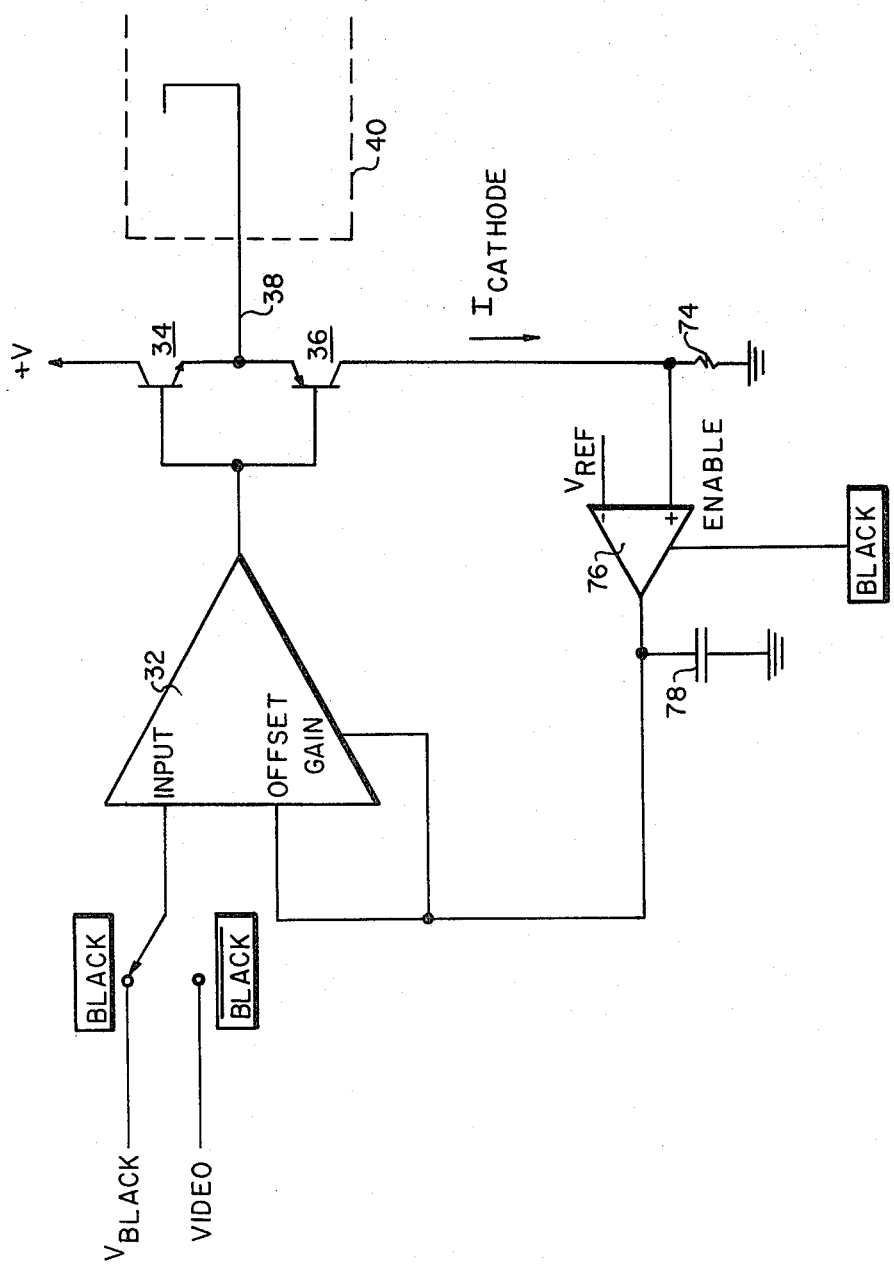

AUTOMATIC CRT TRACKING CIRCUIT

BACKGROUND OF THE INVENTION

The present invention relates generally to the field of television receivers and, more particularly, to improved circuits used in television receivers for compensating for variations in CRT (cathode ray tube) electron gun characteristics.

It is known that the characteristics of the electron guns used in the CRT's of television receivers vary with time as the receiver is used, this variation being commonly manifested in a time varying cathode current versus cathode voltage relationship. More particularly, during the initial burn-in period of the receiver, about 150–200 hours, the cathode current versus cathode voltage relationship of the CRT electron gun is represented by a relatively stable curve such as curve 10 illustrated in FIG. 1. Curve 10 is characterized by a cut-off point 12 corresponding to a cathode voltage in response to which nearly zero cathode current is produced and a particular gain or slope, these characteristics being largely determined by the physical construction of the electron gun and cathode as well as the grid voltages of the CRT. After the initial burn-in period of the receiver, it has been found that the cathode voltage cut-off point of the electron gun may shift such as to a point 14 while the gain or slope of the cathode voltage versus cathode current curve remains substantially unmodified. Therefore, following the burn-in period, the cathode voltage versus cathode current curve may assume, for example, the position illustrated by curve 16 of FIG. 1. As the CRT ages further, the cut-off point 14 remains relatively stable but now the gain of the cathode I-V curve begins to change. Thus, with time, the cathode I-V curve may assume the forms illustrated by curves 18 and 20 of FIG. 1.

The changing cathode I-V characteristic curve of the CRT has a deleterious effect on the image reproduced by the television receiver in that the response of the electron gun cathode to any particular level of video signal is not fixed. For example, assume that a predetermined video signal level, as represented by a corresponding level of cathode voltage, results in the development of a cathode current adapted for producing a white picture signal on the television receiver screen when the CRT is characterized by curve 10 of FIG. 1. Now, as the cathode I-V curve changes in response to cathode aging, the same level of video signal will result in the development of smaller cathode current levels so that picture signals differing from the originally produced white picture signal will be displayed on the CRT screen. This is, of course, a highly undesireable effect in that it reduces the predictability of the qualities of a reproduced image in response to a given video signal.

Prior art techniques utilized to at least partially overcome the foregoing problem include circuits operable for manually adjusting the cathode gain and cut-off characteristics to compensate for aging changes. Such adjustments, however, are normally performed at the factory after the initial burn-in period of the receiver so that no compensation is effected for subsequently occurring changes. Examples of such manual adjustment circuits are disclosed in U.S. Pat. Nos. 3,598,905, 3,705,259, 3,670,095, 3,612,757 and 3,820,155.

Also, as disclosed in an article entitled "Automatic Stabilization of Background Color in Color TV Receivers" published on pages 8–12 of the February, 1977 issue of IEEE Transactions on Consumer Electronics, it is known to provide a circuit which automatically compensates for changes in the cut-off point of the cathode I-V curve. Other similar circuits are disclosed in U.S. Pat. Nos. 4,160,995, 3,976,836, 3,855,614 and 3,737,562. These circuits do not, however, provide compensation for changes in the gain of the curve. As exemplified by U.S. Pat. Nos. 4,012,775 and 4,070,691, it is also known to adjust both the gain and offset of a video signal in an attempt to automatically compensate for changes in the cut-off point and gain of the I-V curve of a CRT cathode. However, the circuits disclosed in these patents tend to be relatively unstable since the adjustments are not made in response to levels of cathode current which are fixed at desired values.

It is accordingly a primary object of the present invention to provide a novel and improved CRT tracking circuit which is highly stable in operation and adapted for automatically compensating for changes in both the cut-off point and the gain of the I-V curve of a CRT cathode, which changes may result from aging or the like.

BRIEF DESCRIPTION OF THE DRAWINGS

FIG. 7 is an electrical schematic diagram, partly in block form, illustrating an alternate embodiment of the present invention.

DESCRIPTION OF THE PREFERRED EMBODIMENTS

Figure 1:
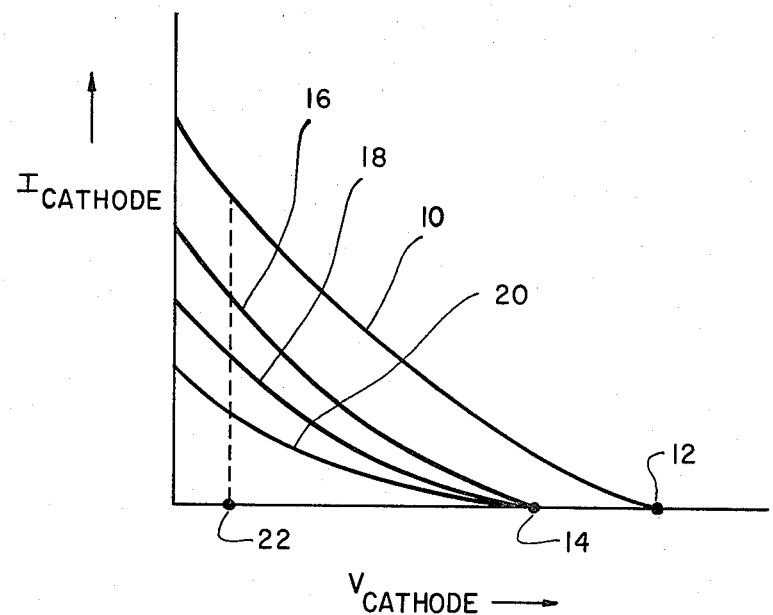
FIG. 1 is a graphical representation illustrating, in an exemplary manner, the changes which occur in the relationship between the cathode current and cathode voltage of a CRT as the CRT ages.

As described above, FIG. 1 shows various cathode I-V curves which may characterize a typical television receiver CRT throughout its lifetime. Thus, the CRT cathode may be defined by an I-V curve 10 having a cut-off point 12 immediately after the manufacture of the television receiver. After the initial burn-in period of the receiver curve 10 may shift to the position indicated by curve 16, the gain or slope of curve 16 being the same as that of curve 10 but the cut-off point shifting to a level indicated by reference numeral 14. With further aging of the CRT cathode, the I-V characteristic may further be displaced as represented by curves 18 and 20. It will be observed that I-V curves 16, 18 and 20 all share the common cut-off point 14 but exhibit different gain or slope characteristics. While the curves shown in FIG. 1 represent a typical aging profile of a CRT cathode, it will be appreciated that the specifically illustrated curves are intended to be of an exemplary nature only and that other aging characteristics are possible.

Figure 2:
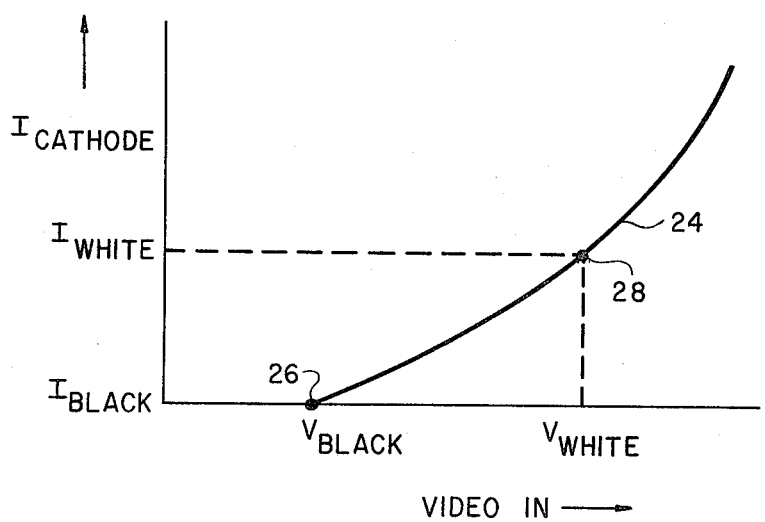
FIG. 2 graphically represents the technique by which one embodiment of the present invention compensates for the changing CRT cathode characteristics depicted in FIG. 1.

The video signal developed in a television receiver is typically inverted and directly coupled by an output video amplifier to the CRT cathode element. Therefore, a large input video signal corresponds to a relatively small cathode voltage such as that represented by the voltage level 22 in FIG. 1. Referring to the exemplary cathode I-V characteristics of FIG. 1, it will be observed that the cathode current developed in response to the video input signal corresponding to the cathode voltage level 22 steadily decreases as the CRT ages. As a consequence, the brightness of the image displayed by the CRT will correspondingly decrease with time for the same input video signal level. The present invention overcomes this problem by compensating for changes in both the cut-off point and gain characteristics of the CRT cathode in a manner such that a desired I-V cathode current results. In particular, in one embodiment of the invention the desired I-V cathode current curve is realized by fixing two different points on the curve, one point representing the CRT cathode cut-off condition which is established by adding or subtracting an adjustable offset level to the input video signal and the other point representing the production of a selected white level picture signal which is established by adjustably controlling the gain of the input video signal. This effect is illustrated graphically in FIG. 2 wherein curve 24 represents the desired response of the cathode current level to the input video signal regardless of CRT cathode aging. This curve is realized by forcing the cathode current to assume a value $I_{black}$ in response to the input video signal assuming a reference voltage level $V_{black}$ as represented by point 26 and by forcing the cathode current to assume a value $I_{white}$ in response to the input video signal assuming a reference level $V_{white}$ as represented by point 28. The fixed relationship represented by point 26 is realized by the offset adjustment introduced to the input video signal while the fixed relationship represented by point 28 is realized by suitably adjusting the gain of the input video signal.

Figure 3:
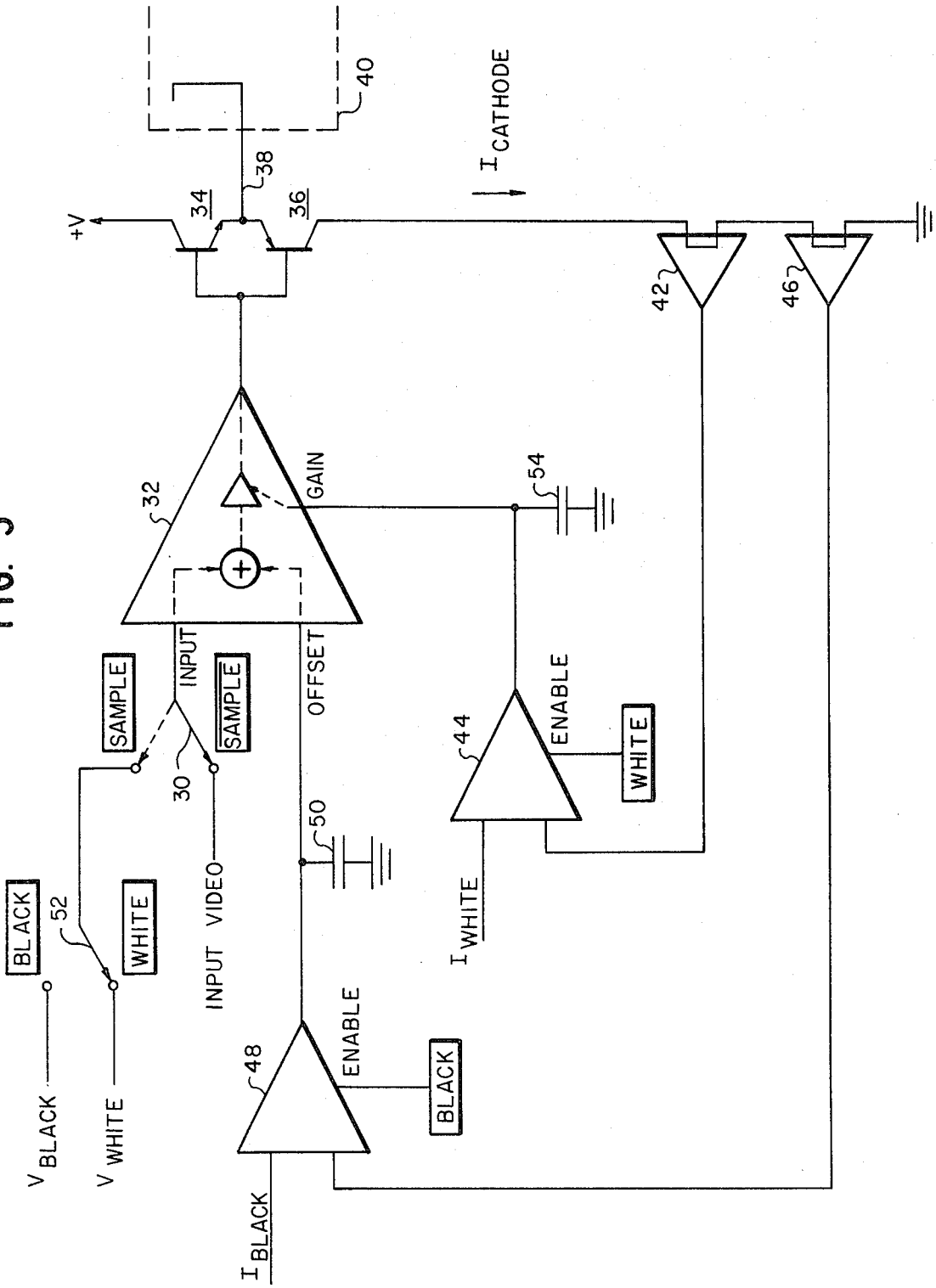
FIG. 3 is an electrical schematic diagram, partly in block form, illustrating an embodiment of the present invention whose operation is represented by the graph of FIG. 2.

FIG. 3 illustrates a circuit adapted for producing the effects illustrated by curve 24 to compensate for changes in the CRT cathode characteristics. In FIG. 3, an input video signal is coupled through a switch 30 to the input of an output video amplifier 32. The video amplifier 32 includes an offset input enabling the level of the input video signal to be selectively shifted and a gain control input enabling the gain of the input video signal to be selectively adjusted. The output of the video amplifier 32 is coupled in common to the bases of a pair of transistors 34 and 36, the emitters of transistors 34 and 36 being connected to the cathode element 38 of a CRT 40. The collector of transistor 34 is connected to a source of positive potential +V while the collector of transistor 36 develops a current substantially equal to the current developed in the cathode element 38 in response to the output of the video amplifier 32.

The current developed in the collector of transistor 36 is fed back through a first current buffer 42 to one input of a current mode difference amplifier 44 and through a second current buffer 46 to one input of a second current mode difference amplifier 48. Reference current level $I_{black}$, corresponding to the desired level of cathode current for cutting off the CRT 40, is coupled to the second input of current mode difference amplifier 48. Reference current level $I_{white}$, corresponding to the desired level of cathode current for causing the CRT 40 to display a white picture element, is coupled to the second input of the current mode difference amplifier 44. The output of the current mode difference amplifier 48, which is enabled by a BLACK enabling signal developed during the vertical interval of the video signal, is used to charge or discharge a first control capacitor 50 the voltage across which is applied to the offset input of output video amplifier 32. At the same time, the BLACK enabling signal operates a switch 52 for coupling a black level reference voltage $V_{black}$ (corresponding to the desired video signal input level for cutting off the CRT 40) through switch 30 to the input of amplifier 32, switch 30 having been moved to the dotted line position in response to a signal SAMPLE which coincides with the vertical interval plus the first few nonplayed horizontal scanning lines of the subsequent field. Therefore, during the vertical interval of the video signal, the black level reference voltage $V_{black}$ is coupled to the input of video amplifier 32 while the feedback loop consisting of current buffer 46, difference amplifier 48 and control capacitor 50 is operative between the collector of transistor 36 and the offset input of amplifier 32.

The output of current mode difference amplifier 44, which is enabled by a WHITE enabling signal developed subsequent of the vertical interval but before the active portion of the subsequent video field (i.e. the first few non-displayed horizontal scanning lines), is used to charge or discharge a second control capacitor 54 the voltage across which is coupled for controlling the gain control input of video amplifier 32. At the same time, the WHITE enabling signal, where WHITE plus BLACK=SAMPLE, operates the switch 52 for coupling a white level reference voltage $V_{white}$ through switch 30 to the input of video amplifier 32. The white level reference voltage $V_{white}$ corresponds to the video signal input level at which the desired white level picture signal is produced by the CRT 40. Therefore, during the duration of the WHITE enabling signal, the white level reference voltage $V_{white}$ is coupled to the input of video amplifier 32 while the feedback loop consisting of current buffer 42, difference amplifier 44 and control capacitor 54 is enabled.

Figure 4:
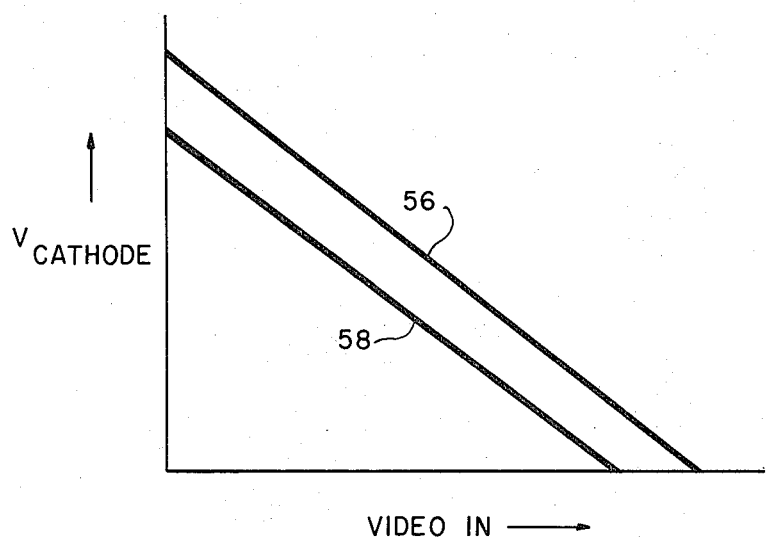
FIGS. 4 and 5 graphically depict the offset and gain transfer functions of the output video amplifier shown in FIG. 3.

In operation, at the commencement of a vertical interval the feedback loop including current mode difference amplifier 48 is enabled and switches 52 and 30 are operated for feeding the black level reference voltage $V_{black}$ to the input of the video output amplifier 32. The output of amplifier 32 is coupled through transistors 34 and 36 to the CRT 40 which develops a corresponding cathode current. The cathode current is sensed by transistor 36 and compared to the $I_{black}$ reference current by current mode difference amplifier 48. The output of difference amplifier 48 appropriately charges or discharges control capacitor 50 for incorporating an offset into the output of video amplifier 32 until the cathode current achieves a level equal to the $I_{black}$ reference current. Therefore, this feedback loop adjusts the offset transfer function of the output video amplifier 32 for forcing the cathode current to equal the $I_{black}$ reference current in response to an input voltage signal level equal to the black level reference voltage $V_{black}$. In other words, this loop fixes point 26 of curve 24 shown in FIG. 2. The foregoing adjustment to the offset transfer function of video amplifier 32 is graphically illustrated in FIG. 4. In this figure, a curve 56 represents the offset transfer function of output video amplifier 32 required to achieve the effects of curve 24 of FIG. 2. A second curve 58 represents an unadjusted offset transfer function of amplifier 32 which may result from a shift in the cut-off point of the CRT 40 as previously explained. The effect of applying the offset voltage developed across capacitor 50 to the video amplifier 32 is to compensate for this shift in the cut-off point by shifting the level of offset transfer function 58 to that of offset transfer function 56.

Figure 5:
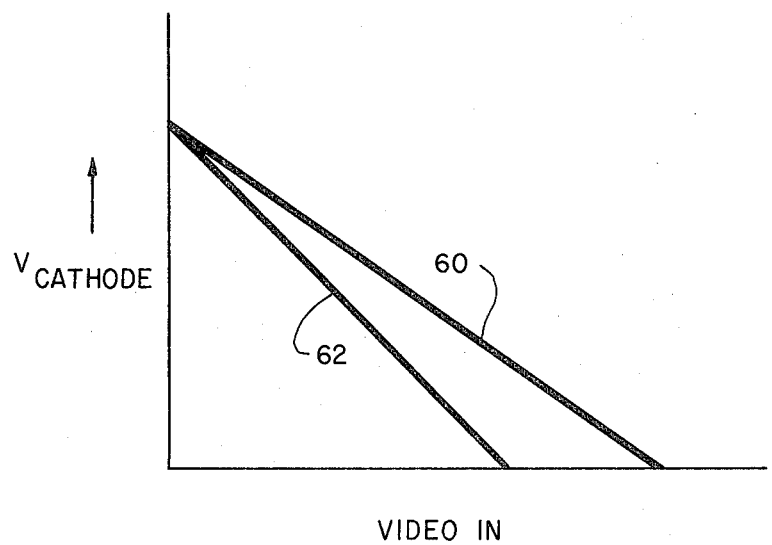

After vertical retrace is complete, but before the active video starts, the WHITE enabling signal enables difference amplifier 44 and switches 52 and 30 are operated for coupling the white level reference voltage $V_{white}$ to the input of video amplifier 32. In this case, the output of difference amplifier 44 charges or discharges control capacitor 54 for adjusting the gain transfer function of output video amplifier 32 until the cathode current is equal to the white level reference current $I_{white}$. Therefore, through the adjustment of the gain transfer function of video amplifier 32, the cathode current is forced to assume a value equal to the white level reference current $I_{white}$ in response to an input voltage level equal to the white level reference voltage $V_{white}$. This action serves to fix the point 28 on curve 24 shown in FIG. 2. The effect of adjusting the gain transfer function of video amplifier 32 is graphically illustrated in FIG. 5. In this figure, a curve 60 represents the desired gain transfer function of the amplifier while a curve 62 represents the unadjusted transfer function due to CRT aging or the like. By means of the gain adjustment effected in response to the voltage developed across control capacitor 54 the gain transfer function 62 is adjusted to coincide with the curve 60.

When the subsequent active video scan is initiated, switch 30 is returned to its solid line position wherein the input video signal is coupled to the input of the output video amplifier 32. Since both difference amplifiers 44 and 48 are now disabled, the control capacitors 50 and 54 maintain the previously set offset and gain adjustments so that a constant cathode current vs. video input signal characteristic is maintained regardless of CRT aging as illustrated by curve 24 of FIG. 2. In particular, a cathode current equal to reference current level $I_{black}$ will always be developed in response to an input video signal equal to the black level reference voltage $V_{black}$ while a cathode current equal to the white level reference current $I_{white}$ will always be developed in response to an input video signal equal to the white level reference voltage $V_{white}$.

Figure 6:
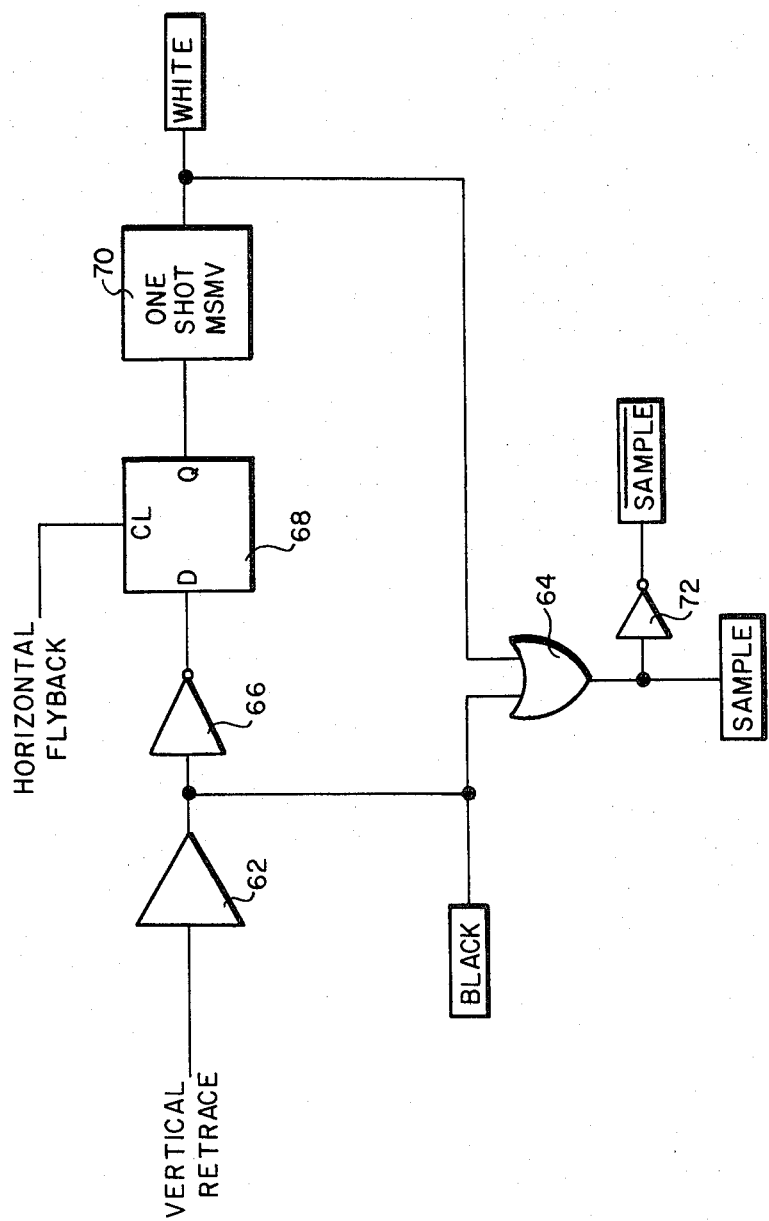
FIG. 6 is a block diagram illustrating an exemplary timing circuit capable of supplying the timing signals required by the circuit of FIG. 3.

FIG. 6 illustrates an exemplary timing circuit which may be used in association with the circuit of FIG. 3 for developing the necessary timing signals. A signal defining the vertical retrace interval is coupled through a Schmitt trigger 62 for forming the BLACK enabling signal. The output of the Schmitt trigger is also coupled to one input of an OR gate 64 and through an inverter 66 to the D input of a flip-flop 68. Flip-flop 68 is clocked by the horizontal flyback signal so that its Q output goes logically high in response to the positive transition of the horizontal flyback pulse occurring after the vertical retrace signal goes logically low. The Q output of flip-flop 68 triggers a one-shot monostable multivibrator 70 whose output forms the WHITE enabling signal. The output of multivibrator 70 is also coupled to the second input of OR gate 64 whose output consequently forms the SAMPLE signal. The SAMPLE signal is then inverted by an inverter 72 to form the signal $\overline{SAMPLE}$.

FIG. 7 illustrates an alternate embodiment of the CRT compensation system of the present invention. In this circuit, which is a somewhat simplified version of the circuit of FIG. 3 using only a single feedback loop, the current developed in the cathode element 38 is sensed in the collector circuit of transistor 36 and developed as a corresponding voltage across a collector resistor 74. The voltage dropped across resistor 74 is coupled to one input of a transconductance amplifier 76, the other input of amplifier 76 being supplied with a reference voltage level $V_{REF}$. The voltage level $V_{REF}$ is equal to the voltage dropped across resistor 74 in response to a cathode current defining a selected cut-off point for the CRT 40. When the amplifier 76 is enabled by the BLACK enabling signal, generated as previously described, an output signal is developed reflecting the difference between the reference voltage $V_{REF}$ and the voltage developed across the resistor 74 for charging or discharging a control capacitor 78. The voltage developed across control capacitor 78 is applied for commonly controlling both the offset and gain transfer functions of video amplifier 32 whose input has been switched for receiving the black level reference voltage $V_{black}$. The charging or discharging of the capacitor 78 will continue until the gain and offset of amplifier 32 have been adjusted such that the two voltages fed to amplifier 76 are equal. In this manner, during the vertical retrace interval, the gain and offset transfer function of amplifier 32 have been set such that a desired cathode cut-off current is developed in response to an input signal equal to the black level reference voltage $V_{black}$.

Upon termination of the vertical retrace interval, the amplifier 76 is disabled and the input of amplifier 32 is switched for receiving the input video signal. The control capacitor 78 will maintain the previous setting of amplifier 32 thereby compensating the input video signal for changes in the CRT cathode due to aging or the like.

What has thus been shown is a novel CRT tracking circuit adapted for automatically compensating for changes in both the cut-off point and gain of the I-V curve of a CRT cathode, which changes may result from cathode aging or the like.

While particular embodiments of the present invention have been shown and described, it will be obvious to those skilled in the art that various changes and modifications may be made without departing from the invention in its broader aspects. The aim in the appended claims is to cover all such changes and modifications as may fall within the true spirit and scope of the invention.

What is claimed is:

1. In a television receiver of the type having at least one CRT including an electron gun and a cathode element and having means for generating a video signal, the improvement comprising:

means for generating a first reference voltage defining a video signal level in response to which it is desired to develop a first predetermined current level in said cathode element;

means for generating a second reference voltage defining a video signal level in response to which it is desired to develop a second predetermined current level in said cathode element;

means for generating third and fourth reference signals representing said first and second predetermined current levels respectively; and control means responsive to said first and second reference voltages and to said third and fourth reference signals for coupling said video signal to said cathode element in a form such that a current signal is produced in said cathode element equal to said first predetermined current level in response to said video signal assuming a value equal to said first reference voltage and equal to said second predetermined current level in response to said video signal assuming a value equal to said second reference voltage, whereby a desired video signal versus cathode current relationship is achieved independent of the characteristics of said CRT.

2. The improvement according to claim 1 wherein said first reference voltage comprises a black level reference voltage and wherein said first predetermined cathode current level is adapted for cutting-off said CRT.

3. The improvement according to claim 2 wherein said second reference voltage comprises a white level reference voltage and wherein said second predetermined cathode current level is adapted for operating said CRT for reproducing a desired white level picture signal.

4. In a television receiver of the type having at least one CRT including an electron gun and a cathode element and having means for generating a video signal, an improved CRT tracking circuit comprising:

amplifier means having adjustable gain and offset transfer functions, the output of said amplifier means being coupled to said cathode element;

means developing a black level reference voltage and a signal representing a black level reference current defining the cut-off point of said CRT cathode element;

means developing an enabling signal during the vertical interval of a transmitted television signal;

switching means coupling said black level reference voltage to said amplifier means in response to said enabling signal and otherwise coupling said video signal to said amplifier means; and feedback means enabled in response to said enabling signal for simultaneously adjusting the gain and transfer functions of said amplifier means for causing the current developed in said cathode element to assume a value equal to said black level reference current.

5. The CRT tracking circuit of claim 4 including means for sensing the current developed in said cathode element, said feedback means comprising comparison means enabled in response to said enabling signal for developing a control signal reflecting the difference between said signal representing said black level reference current and said sensed cathode current and means coupling said control signal for simultaneously adjusting the gain and offset transfer functions of said amplifier means until said sensed cathode current is equal to said black level reference current.

6. In a television receiver of the type having at least one CRT including an electron gun and a cathode element and having means for generating a video signal, an improved CRT tracking circuit comprising:

amplifier means having adjustable gain and offset transfer functions, the output of said amplifier means being coupled to said cathode element;

means developing a black level reference voltage and a black level reference current defining the cut-off point of said CRT cathode element;

means developing a white level reference voltage and a white level reference current defining the video voltage and cathode current levels respectively in response to which a desired white level picture signal is produced by said CRT;

means developing a first enabling signal during the vertical interval of a transmitted television signal and a second enabling signal after said vertical interval but before the active portion of the transmitted television signal;

switching means coupling said black level reference voltage to said amplifier means in response to said first enabling signal, said white level reference voltage in response to said second enabling signal and otherwise coupling said video signal to said amplifier means;

first feedback means enabled in response to said first enabling signal for adjusting the offset transfer function of said amplifier means for causing the current developed in said cathode element to assume a value equal to said black level reference current; and second feedback means enabled in response to said second enabling signal for adjusting the gain transfer function of said amplifier means for causing the current developed in said cathode element to assume a value equal to said white level reference current.

7. The CRT tracking circuit of claim 6 including means for sensing the current developed in said cathode element, said first feedback means comprising comparison means enabled in response to said first enabling signal for developing a first control signal reflecting the difference between said black level reference current and sais sensed cathode current and means coupling said first control signal for adjusting the offset transfer function of said amplifier means until said sensed cathode current is equal to said black level reference current.

8. The CRT tracking circuit of claim 7 wherein said second feedback means comprises comparison means enabled in response to said second enabling signal for developing a second control signal reflecting the difference between said white level reference current and said sensed cathode current and means coupling said second control signal for adjusting the gain transfer function of said amplifier means until said sensed cathode current is equal to said white level reference current.

9. In a television receiver of the type having at least one CRT including an electron gun and a cathode element, means for coupling a video signal through a video signal channel to said CRT and feedback means adjusting the gain and offset of said video signal channel to compensate for changing CRT characteristics, the improvement wherein said feedback means comprises:

means developing a first reference voltage;

means coupling said first reference voltage to said video signal channel during an inactive portion of said video signal and otherwise coupling said video signal to said video signal channel;

means developing a signal representing a first reference current which corresponds to a desired level of cathode current developed in response to said first reference voltage; and means operable during said inactive portion of said video signal and responsive to said signal representing said first reference current for adjusting the gain and offset of said video signal channel for causing the current developed in said cathode to assume a value equal to said first reference current in response to said video signal assuming a value equal to said first reference voltage.

10. The improvement according to claim 9 wherein said first reference voltage comprises a black level reference voltage and wherein said first reference current corresponds to a cathode current level adapted for cutting-off said CRT.

11. The improvement according to claim 10 wherein said means for adjusting comprises means for comparing said first reference current with the current developed in said cathode element in response to said black level reference voltage for developing an error signal adapted for adjusting the gain and offset of said video signal channel.

12. In a television receiver of the type having at least one CRT including an electron gun and a cathode element, means for coupling a video signal through a video signal channel to said CRT and feedback means adjusting the gain and offset of said video signal channel to compensate for changing CRT characteristics, the improvement wherein said feedback means comprises:

means developing first and second reference voltages;

means coupling said first and second reference voltages to said video signal channel during first and second inactive portions of said video signal respectively and otherwise coupling said video signal to said video signal channel;

means developing third and fourth reference signals representing first and second reference currents which correspond to desired levels of cathode current developed in response to said first and second reference voltages respectively;

means operable during said first inactive portion of said video signal and responsive to said third reference signal for adjusting the offset of said video signal channel for causing the current developed in said cathode to assume a value equal to said first reference current in response to said video signal assuming a value equal to said first reference voltage; and means operable during said second inactive portion of said video signal and responsive to said fourth reference signal for adjusting the gain of said video signal channel for causing the current developed in said cathode to assume a value equal to said second reference current in response to said video signal assuming a value equal to said second reference voltage.

13. The improvement according to claim 12 wherein said first reference voltage comprises a black level reference voltage and wherein said first reference current corresponds to a cathode current level adapted for cutting-off said CRT.

14. The improvement according to claim 13 wherein said second reference voltage comprises a white level reference voltage and wherein said second reference current corresponds to a cathode current level adapted for operating said CRT for reproducing a desired white level picture signal.

15. The improvement according to claim 14 wherein said means for adjusting the offset of said video signal channel comprises means for comparing said first reference current with the current developed in said cathode element in response to said black level reference voltage for developing a first error signal adapted for adjusting the offset of said video signal channel.

16. The improvement according to claim 15 wherein said means for adjusting the gain of said video signal channel comprises means for comparing said second reference current with the current developed in said cathode element in response to said white level reference voltage for developing a second error signal adapted for adjusting the gain of said video signal channel.

* * * * *